United States Patent
Parker

(10) Patent No.: US 11,498,527 B2
(45) Date of Patent: Nov. 15, 2022

(54) SYSTEM FOR OPTIMIZING THE USE AND THE INCOME GENERATION BY A SERVICE STATION OF WASHING FLUIDS

(71) Applicant: Hightech Solutions NYC, LLC, Montclair, NJ (US)

(72) Inventor: Bradley E Parker, Glen Ridge, NJ (US)

(73) Assignee: HIGHTECH SOLUTIONS NYC, LLC, Montclair, NJ (US)

(*) Notice: Subject to any disclaimer, the term of this patent is extended or adjusted under 35 U.S.C. 154(b) by 17 days.

(21) Appl. No.: 17/239,909

(22) Filed: Apr. 26, 2021

(65) Prior Publication Data
US 2021/0300302 A1 Sep. 30, 2021

Related U.S. Application Data

(63) Continuation-in-part of application No. 16/530,081, filed on Aug. 2, 2019, now Pat. No. 11,034,334, which is a continuation of application No. 14/719,578, filed on May 22, 2015, now Pat. No. 10,414,381.

(51) Int. Cl.
*B60S 1/50* (2006.01)
*G06Q 30/02* (2012.01)

(52) U.S. Cl.
CPC ............ *B60S 1/50* (2013.01); *G06Q 30/0283* (2013.01)

(58) Field of Classification Search
CPC .............................. G06Q 30/0283; B60S 1/50
See application file for complete search history.

(56) References Cited

U.S. PATENT DOCUMENTS

2010/0258587 A1* 10/2010 Wheeler ................... B60S 1/50 222/2

OTHER PUBLICATIONS

Sacile, Roberto; Remote real-time monitoring and control of contamination in underground storage tank systems of petrol products; Journal of Cleaner Production, 15, 1295, 1302 (Year: 2007).*

* cited by examiner

*Primary Examiner* — Emmett K. Walsh
(74) *Attorney, Agent, or Firm* — Duane Morris LLP; Alain Villeneuve

(57) ABSTRACT

The present invention relates to a system for optimizing the use and the income generated a service station or other service locations where different service related fluids are used by service providers and retail users, and more specifically to the coordination at both retail and an associated services station of fluids like window washing fluids using a multiple wall mounting dispensers and a remove dilution device. Also part of the system are HTML based tools for the management of the fluids and the management of information between the service station operators, the clients, and the service provider in charge of maintaining the system. Also included are methods of use thereof.

18 Claims, 11 Drawing Sheets

SYSTEM FOR OPTIMIZING THE USE AND THE INCOME GENERATION BY A SERVICE STATION OF WASHING FLUIDS

CROSS REFERENCE TO RELATED APPLICATIONS

The present application is a continuation-in-part application of U.S. patent application Ser. No. 16/530,081 also entitled SYSTEM FOR OPTIMIZING THE USE AND THE INCOME GENERATION BY A SERVICE STATION OF WASHING FLUIDS filed Aug. 2, 2019, and continuation application Ser. No. 14/719,578 entitled SYSTEM FOR OPTIMIZING THE USE AND THE INCOME GENERATION BY A SERVICE STATION OF WASHING FLUIDS" filed May 22, 2015, now issued as U.S. Pat. No. 10,414,381 issued on Sep. 17, 2019 of which both are herein incorporated by reference.

FIELD OF THE INVENTION

The present invention relates to a system for optimizing the use and the income generated a service station or other service locations where different service related fluids are used by service providers and retail users, and more specifically to the coordination at both retail and an associated services station of fluids like window washing fluids using a multiple wall mounting dispensers and a remote dilution device. Also part of the system are HTML based tools for the management of the fluids and the management of information between the service station operators, the clients, and the service provider in charge of maintaining the system. Also included are methods of use thereof.

BACKGROUND

The automobile industry is a key component of the U.S. economy. It's diversity and complexity does not need to be demonstrated. Most adults own or have access to at least one vehicle which they drive on a daily basis. Many families own multiple vehicles. Millions of vehicles are sold each year, and the cost of vehicles is one of the most important part of a family's annual budget. While few customers know in detail the industry, they all are extremely attentive to new services or innovations that would result in helping lower the overall cost of a vehicle.

Vehicles require routine and exceptional maintenances, repair, management of recalled parts for safety, periodic refueling, and a need to replenish certain fluids as part of routine or exceptional maintenance. For example, cars need window washer fluids sprayed onto a window by wiper blades to help clear a view and help with driving conditions. A car requires other fluids, for example cooling recirculation fluids, lubricating oil, fuel, and water. One key problem with these needs is their complexity. Too often, mechanics or service stations with trained individuals offer help for vehicle owners.

Since the repair and maintenance of vehicles is often in contact with dirty fluids or components, service stations tend to easily get dirty. Vehicle owners rarely enjoy direct contact with greasy and messy environments and therefore service stations endeavor to create a cleaner and safer work environment and service environment where clients can feel at ease. For example, the ground of a working station of a mechanics can be painted and maintained somewhat cleaned. Mechanics can be given stain resistant clothing to further help the overall client experience.

Many service stations have three main areas, a retail vehicle service area, a retail vending area, and a vehicle repair area. The retail vehicle service area as shown for example in FIGS. 1, and 2 from the prior art shows how fuel pumps (often with rain protector) are accessible directly by clients. A person will stop, slide a credit card and select fuel. Often, clients will grab a spout handle and after making sure the fuel is of a certain type will fill the vehicle at need. User know that too often hands will be smelly after use of these handles and oil may.

FIG. 1 is taken from U.S. Pat. No. 6,230,939 from the prior art. In this figure, fuel tanks are buried deep under the ground. What is shown is the use of a secondary system to the fuel pumps 11 placed on top of the system for example as a box 70 mounted on part of the structure capable of dispensing part of a fluid 20 on the roof 14 of the structure. While at a glance this turn of the millennium system appears useful to give drivers a new tool and easier access to quickly fill their vehicles with window washing fluids, the system has never met any commercial success. The reasons are numerous and help understand why the currently disclosed system is an improvement.

As shown, placing the fluid 20 on the roof 14 creates multiple problems. They are not easy of access, their level cannot easily be monitored and they are vulnerable to weather. In addition, the system requires installation, monitoring, and maintenance. A service station owner is highly unlikely to pay money to buy and install this system, simply to replace currently existing systems. Unlike fuel, window washing fluid at the retain vending area is infrequent and the cost of washer fluid must be compared with the current solution of selling drivers in the retail vending area gallon jugs of containers to be poured immediately or to be stored partly in the trunk of the vehicle. In addition, based on weather conditions, the fluid needed may require different properties, for example a different freezing point. With the system as shown at FIG. 1, if it is filled with low cost high temperature fluid, it would have to be purged for a lower temperature solution to be used. From a cost-benefit perspective, these solutions appear useful, they are not and over time, the market has proven this fact. Air for tires, unlike washing fluid on the other hand is often sold using these retail solutions.

One other problem of placing fluids at the retail vehicle service area is theft or destruction. The solution contemplated by the system shown at FIG. 1 from the prior art is to place the product as far away from the user in the retail vehicle service area as possible. FIG. 2 also from the prior art, published as U.S. application Ser. No. 12/758,737 a different take. In this system showed as a larger stand-alone station 110, the base of a cabinet 112 is designed to hold a pumping and delivery mechanism for use the person. To better understand why this solution is not desirable, window washer fluid is generally retailed in the United States in a 128 oz. gallon at a price around $1.80 to $2.50 as of the filing of this application. Since the internal volume of the reservoir of most cars varies from a fraction of a gallon to a gallon or more, the use of the device shown at FIG. 2 would result in a sale of $1 to $3 dollars at most. At these levels of transaction, most electronic cards will impose additional surcharges. The stand-alone cabinet 112 of FIG. 2 at best contains 10 gallons or about twenty-five dollars of fluid. There is simply no cost efficient way to profit from installing, manufacturing, and servicing the device as shown with such low costs. Even if a user is willing to pay twice as much for the product, the margin remains too small to justify the cost of monitoring levels and sending a person to refill the cabinet 112. What is needed is a cost-efficient, and useful way that can be implemented by service stations to bring to the retail vehicle service area these types of secondary fluids.

Also, it is common for window washing fluids to be sold in jugs or large plastic containers. These "normally blue" gallons are stacked on pallets and often will be stolen, damaged, or will be lost to the wind. The gas station operator or the location will be forced to manage this service at very little profit for automobile drivers. As shown at FIG. 2 some users could want to place a jug in the trunk and once in a while use the device shown to refill it. But this results in filling the trunk with a rounded container of liquid that splashes and moves around all to save a handful of dollars. In addition, in the device of FIG. 2, since the fluid is diluted to the need of car owner, the system cannot truly manage volumetric precise changes. Payment of a fixed sum, like in air devices where quarters are inserted force the device to work for a fixed period of time can result in spillage or insufficient volumetric flow. Also, in the system shown at FIG. 2, most users will believe like the normal gas pump, the system comes with an anti-splash systems resulting in spills. The inventor has found that the system described and patented can be further enhanced to help offer additional features including features designed to replace and optimize the known jugs of washing fluids in a cost efficient way.

Also, as society advances, the classic business model around the fuel engine is slowly being replaced by cleaner electric vehicles. Because of the lack of combustion/explosion which takes place in electrical engines, the maintenance on such systems is completely different and often maintenance cannot be offered at random locations along a road. Often, electric cars do not require the same level of maintenance and over time, it is logical to imagine that slowly repair areas will transform away from classic repair and maintenance services to stand-alone electrical station that offer service to electric vehicles. Electric cars have equal if not a greater need for cleaning services as often instead of a simple front windshield glass, many electric cars have larger window surfaces to clean and maintain. What is needed is an invention which is already patented but in part optimized and updated to better service the new electric car industry.

BRIEF DESCRIPTION OF THE DRAWINGS

Certain embodiments are shown in the drawings. However, it is understood that the present disclosure is not limited to the arrangements and instrumentality shown in the attached drawings.

SUMMARY

Figure 1:
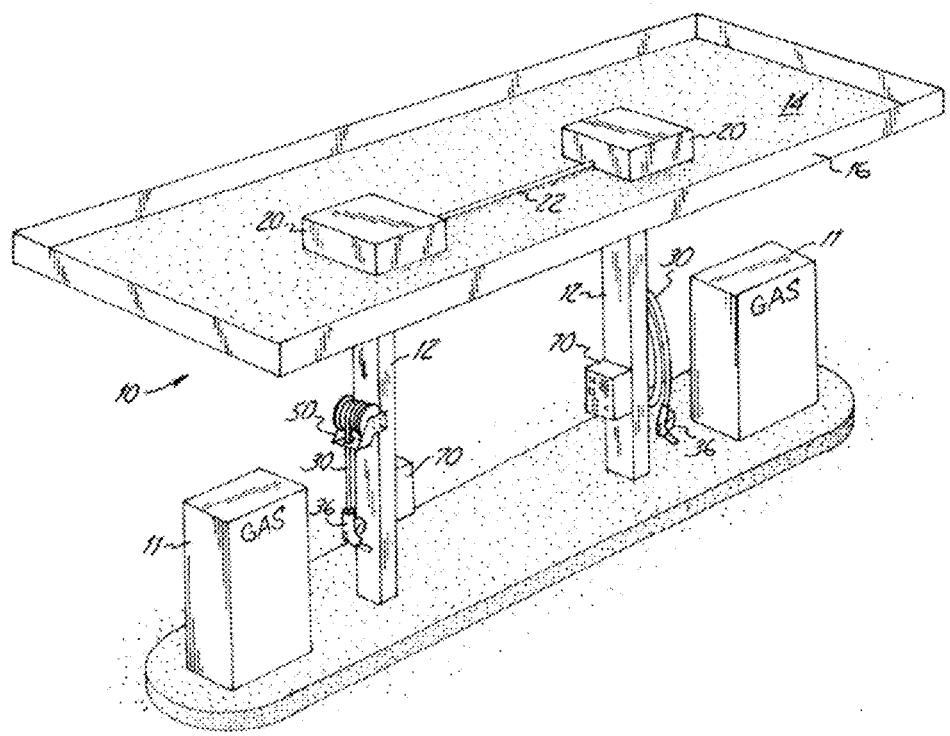
FIG. 1 is a first illustration from the prior art.

The present invention relates to a system for optimizing the use and the income generated a service station or other service locations where different service related fluids are used by service providers and retail users, and more specifically to the coordination at both retail and an associated services station of fluids like window washing fluids using a multiple wall mounting dispensers or remote dispensers. Also part of the system are HTML based tools for the management of the fluids and the management of information between the service station operators, the clients, and the service provider in charge of maintaining the system. Also included are methods of use thereof.

DETAILED DESCRIPTION

For the purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications in the illustrated devices and such further applications of the principles disclosed and illustrated herein are contemplated as would normally occur to one skilled in the art to which this disclosure relates.

The Fluid Transfer System

Figure 2:
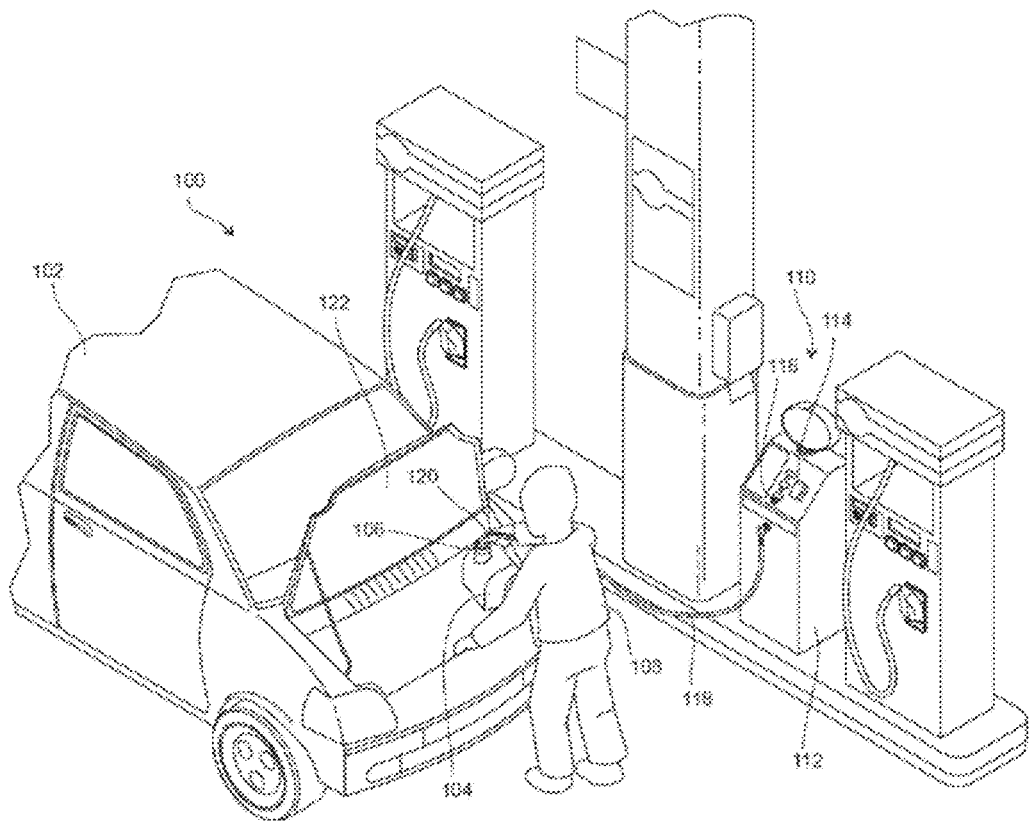
FIG. 2 is a second illustration from the prior art.
Figure 3:
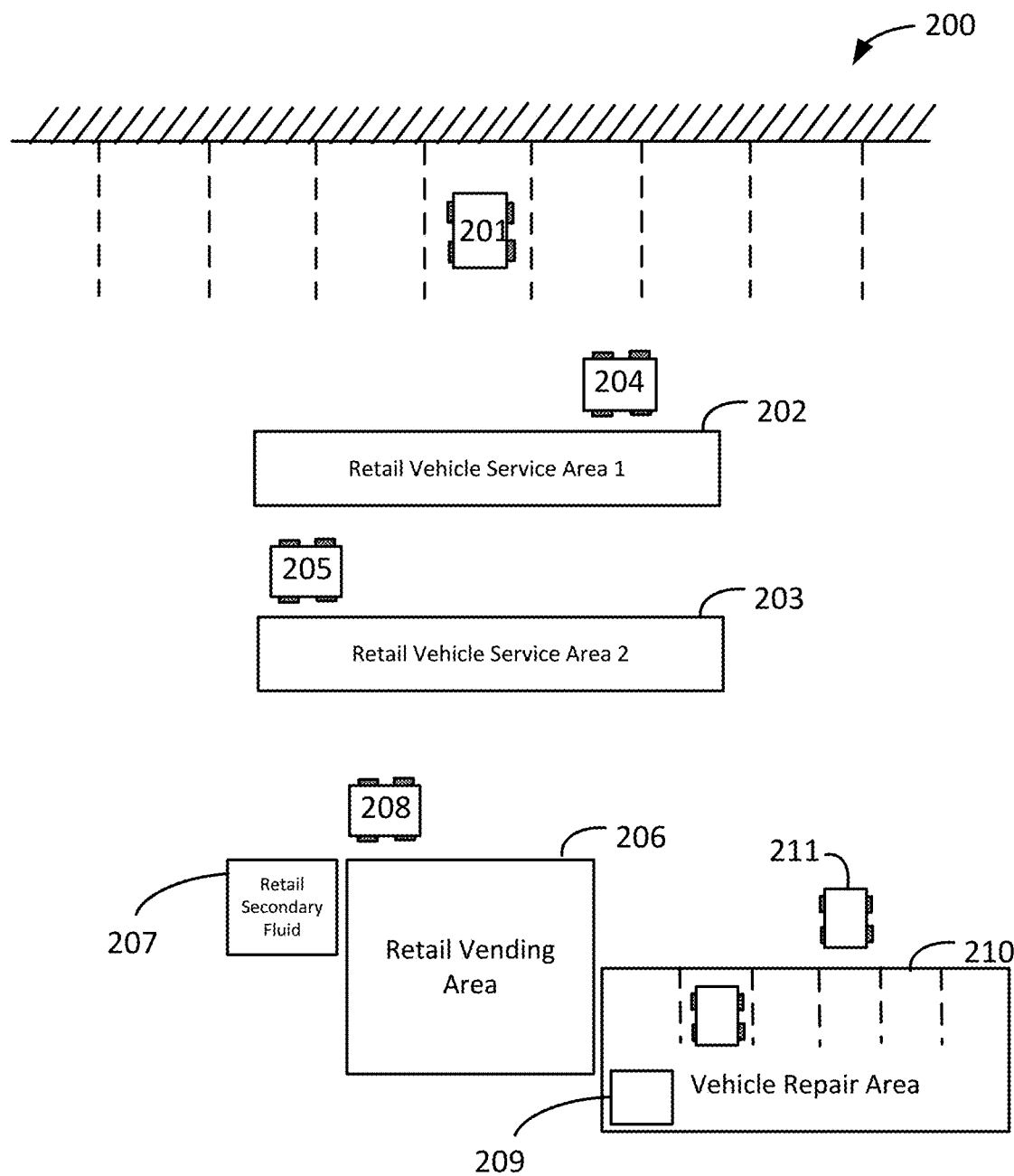
FIG. 3 is an illustration showing the different areas found in a typical service station.

The inventor of the current invention is the first to leverage the unique mechanics of service stations 200 as shown at FIG. 3. In FIG. 3, cars 201 will travel to different areas of the station 200. These areas include one of multiple (shown as Area 1 and Area 2) a retail vehicle service areas 202, 203. These areas 202, 203 are generally shown at FIGS. 1, and 2 from the prior art. Cars or other vehicles 204, 205 travel into these areas for refueling. In addition, many service stations have retail vending areas 206 where as part of the products sold in retail, secondary fluids can be sold in containers. As part of FIG. 3, the retail secondary fluid 207 is shown next to a vehicle 208 and the retail vending area 206. One of ordinary skill in the art will recognize that while the retail secondary fluid 207 is shown next to the retail vending area 206, it can be located at any place. Often, to promote sales of gallons of window washing fluid, these will be stacked inside the retail vending area 206 or in the service area 202. FIG. 3 also shows that some service stations 200 also need a storage of secondary fluid at a repair secondary fluid supply area 209 at the vehicle repair area 210 as shown. This vehicle repair area 210 is the location where maintenance and repairs are offered where cars being maintained will need refueling of secondary fluid 211.

The first important unique concept of the below described invention relies on the fact that not only do the vehicle drivers at 204, and 205 require secondary fluid, the employees of the service station 200 also must offer the fluid. The current system as shown forces the vehicle repair area 210 to store a large quantity of non-retail fluid 209 for use by the different mechanics. Currently, most of the service stations require drivers of vehicles 204, 201, and 205 to drive to the retail vending area 206 as illustrated by vehicle 208 to grab retail secondary fluid 207. The inventions shown at FIGS. 1, and 2 from the prior art removes the retail secondary fluid 207 as shown from the retail vending area 206 and places it directly at the retail vehicle service areas 202, 203.

Figure 4:
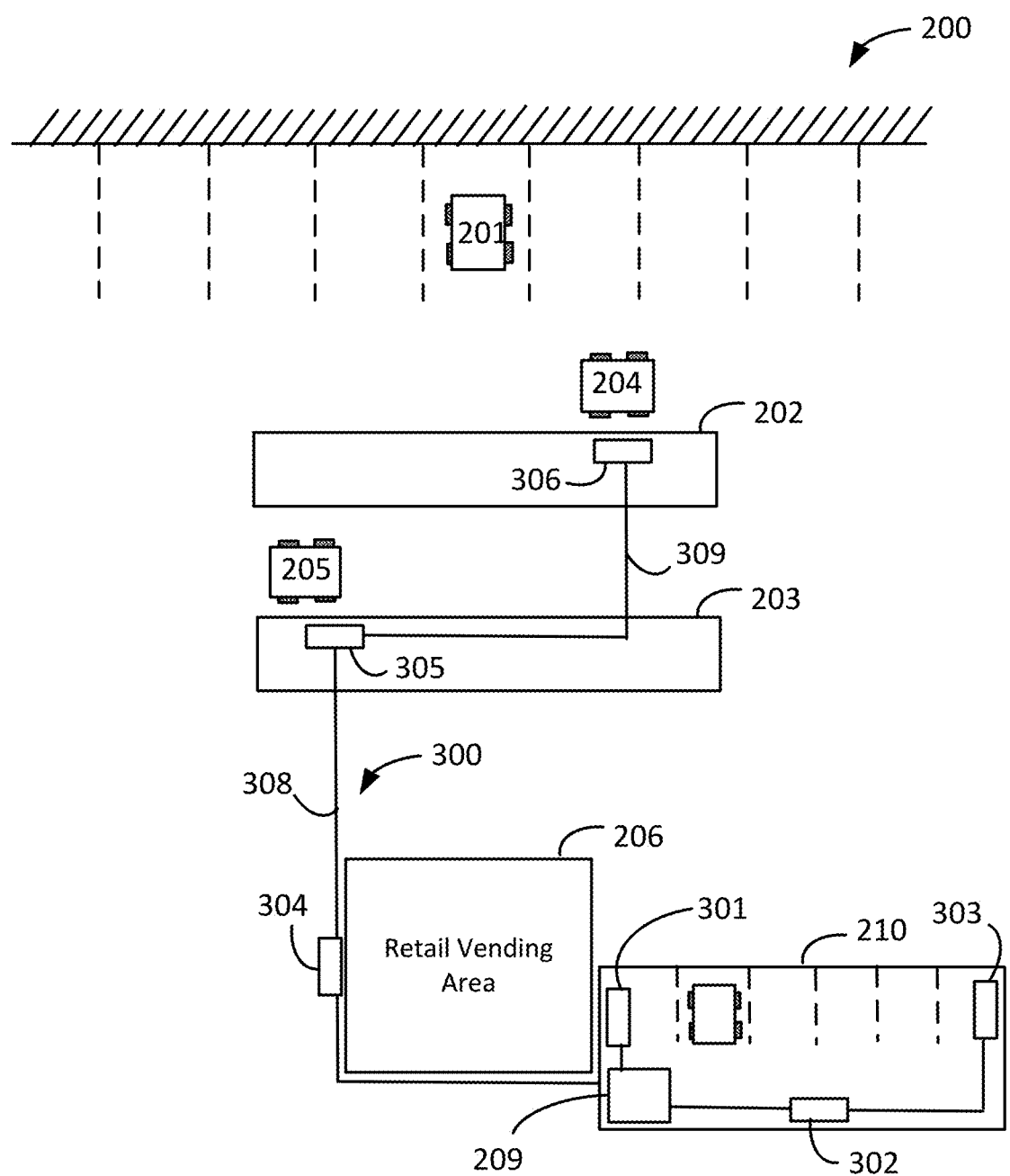
FIG. 4 is a functional illustration of the current system for optimizing the use and the income generated at a service station from different fluids as implemented in the typical service station shown at FIG. 3.
Figure 13:
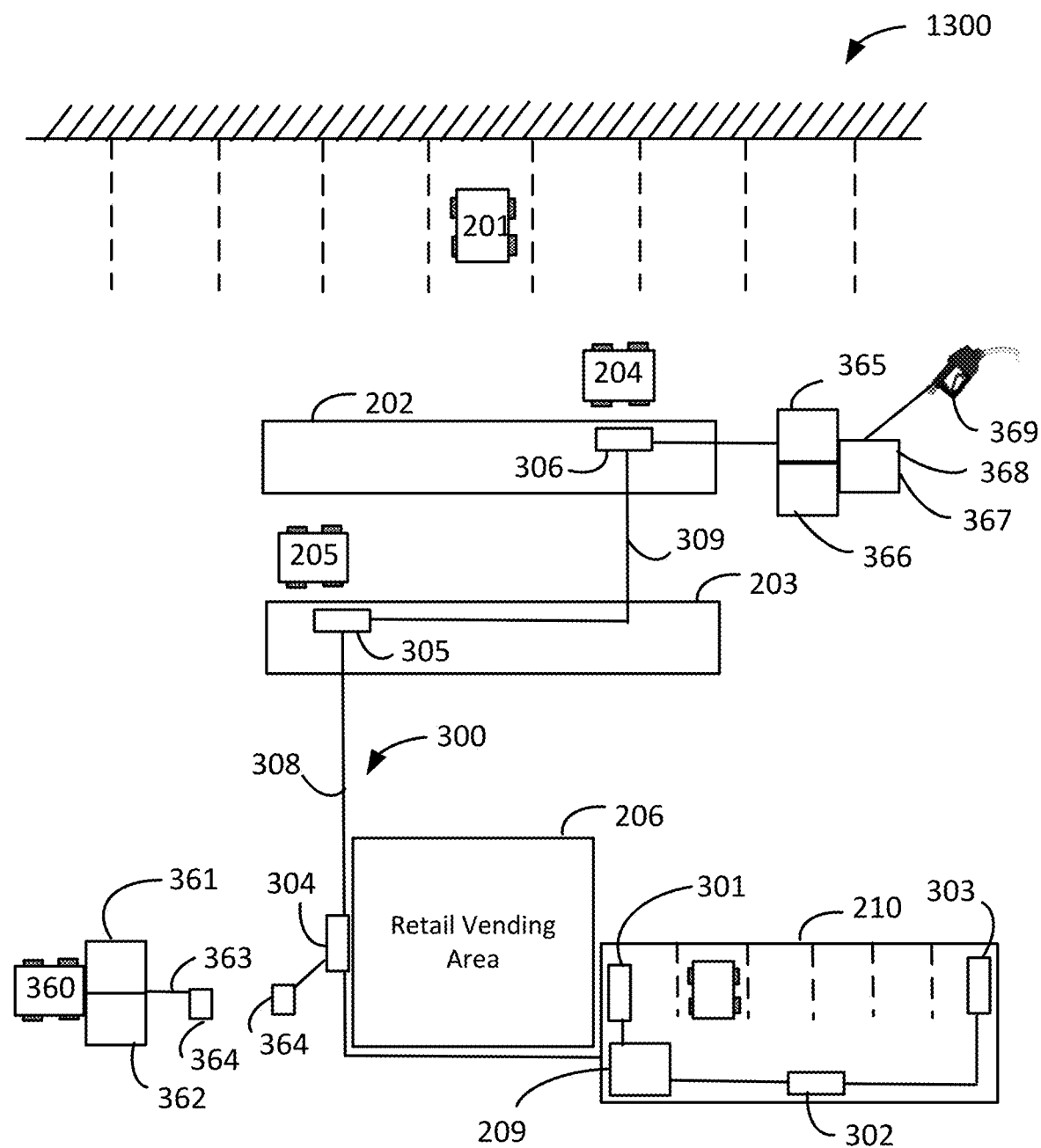
FIG. 13 is a revised and updated version of FIG. 3 illustrating the different areas of a station with a portable device according to an embodiment of the present disclosure.

FIG. 4 shows an overview of the service station 200 where a system 300 is shown for optimizing the use and the income generation by a service station 200 of washing fluids or any other secondary fluid 209. This system 300 relies on the principle that as part of the currently existing process shown at FIG. 3, non-retail fluid 209 is already present in the vehicle repair area 210 or can be present in vehicles to be driven to the service station 200 in a non-diluted way 360 as shown at FIG. 13. Each time a car is maintained, as part of the routine maintenance filters are changed, air is placed in the tires, and fluid is inserted in the different cars. Each time an electric vehicle or other newly designed vehicle with lower maintenance needs is maintained, as part of this limited routine maintenance fluid is inserted in the storage volumes for cleaning the windows. The current system relies on the fact that a technician or an expert must already visit periodically these repair areas 210 to refill the liquid often found in a very large volume (for example 250 gallons). Since the call relates to a larger volume of fluid, this product has a lower cost per gallon (for example $0.50 per gallon) and the cost of the refill call is absorbed by the volume transaction.

Small wall mounted dispensers 301, 302, 303, 304, 305, and 306, each described below, are connected via a set of valves to the main container 209 located inside the vehicle repair area 210 as shown or anywhere convenient for maintenance as shown at FIG. 4 or connected to the portable device 360 as shown at FIG. 13. While the system appears to be limited to one secondary fluid, for example window washing fluid, the system may in fact be equipped to handle several different secondary fluids. Having a single centralized storage for one or multiple fluids 209 allows for the change of the fluid, based on demand or weather conditions to be simple and efficient. In one embodiment, a purge of the lines can be used when the fluid is changed simply by walking an operator to teach of the dispensers 301 to 306 and holding them open over an opened drum as the fluid in the line flows out. Also, as shown at FIG. 13, the storage 209 can be local as shown at FIG. 13 or can be replaced with a portable device 360 equipped with a concentrated fluid reservoir located on the device 361 and/or a water fluid reservoir 262 and a portable device-mounted dispenser 363 with a connector 364 for connection to a local device 301, 302, 303, 304, 305, or 306, to a mating connector 365 to the connector 364 for the transfer of diluted fluid. Also shown at FIG. 13, is a local device 306, shown with a user-vending mechanism 365 with a volumetric pump 366, with a volume selector 367 connected to the volumetric pump 366 for dispensing a volume selected by the user on a display 368 and a pouring nozzle 369.

One of ordinary skill in the art will recognize that as shown tubes can be used to help convey the fluid 209 to the different dispensers 301 to 306. These tubes may be attached to the wall of structures or may be rested on the ground using stabilizers. Tubes 308 and 309 for example may be buried under the ground or simply be of a type which is resilient enough to withstand vehicle movements. In another embodiment, these tubes 308, 309, can be joined at the hip inside of other cables or connectors already passing in the path of vehicles.

As shown at FIG. 4, the inside wall of the vehicle repair area 210 can be lined with multiple wall mounted dispensers 301, 203, and 303 each with a short distance hose and spout. For example, the vehicle repair area 210 can have multiple working bays each for holding a vehicle. This system allows the fluid to be closer to the needed vehicle location and prevent any spillage or waste. As shown, one dispenser 304 can be attached against a retail vending area 206 for example when an air system is provided. Air is different in many ways, for example a local compressor will produce the air at the desired pressure. The system is shown in association with a small station 200. As can be imagined, the system as shown can be expanded to different size and shape installations. For example, for large rest areas for tucks, the system 300 can easily be adapted and the cost savings will be even greater. The logic of this single storage system can be extrapolated to multiple different structures.

Figure 5:
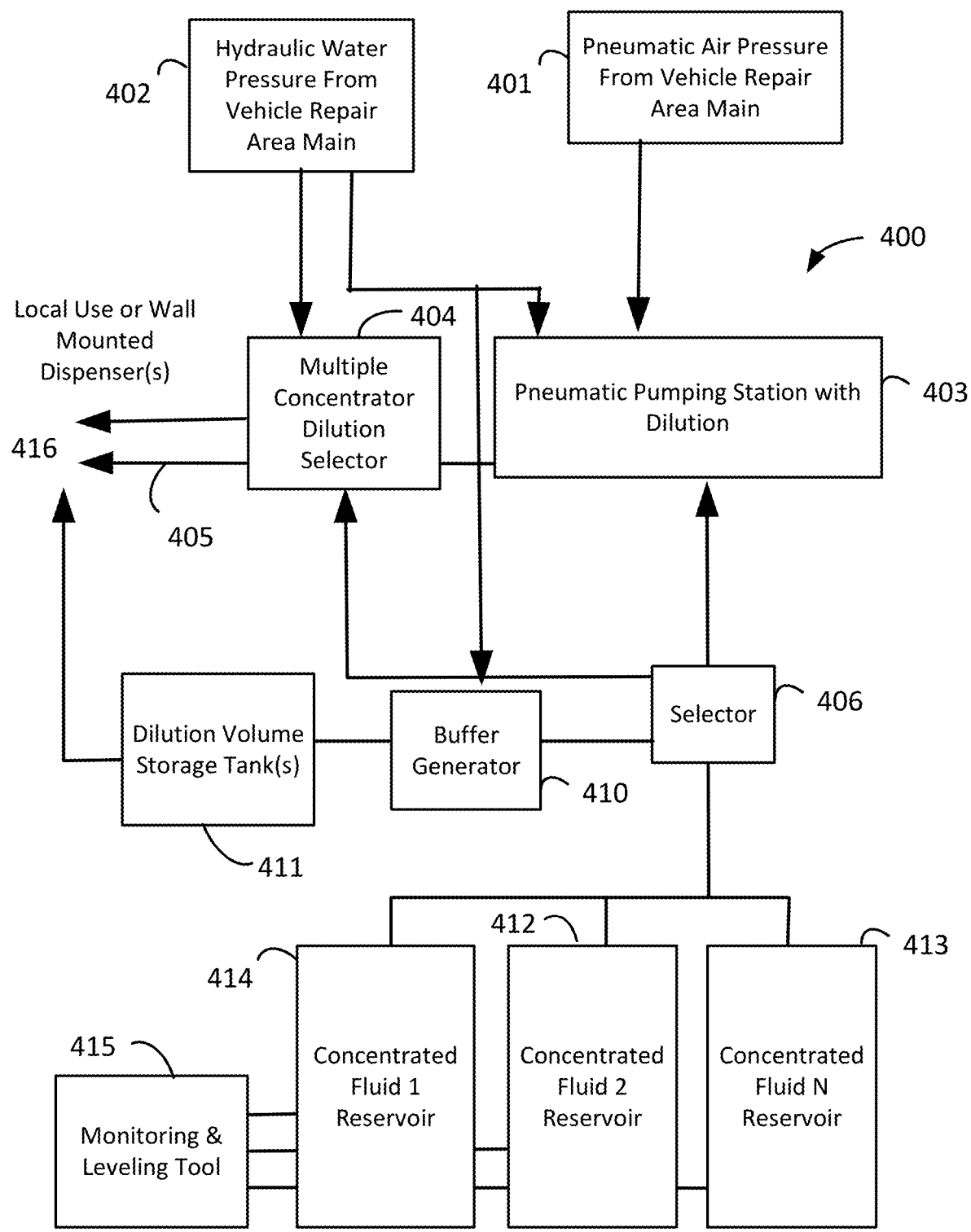
FIG. 5 is a functional diagram of the fluid distribution system as part of the system for optimizing the use shown at FIG. 4 according to an embodiment of the present disclosure.

FIG. 5 a functional diagram of the fluid distribution system 400 as part of the system for optimizing the use shown at FIG. 4 according to an embodiment of the present disclosure. As shown, the system 400 can be connected to the different service fluids or energy found at for example the vehicle repair area 210. As shown at FIG. 5, hydraulic pressured water can be used 402, or pneumatic pressurized air 401 can be used. As part of vehicle repair areas 210, these fluids (and others) are generally available. They rely on compressors or on the supply from an external source. As illustrated, these fluids 401, 402, can be used by for example by one of multiple tools which will help process concentrated fluids 412, 413, and 414 illustrated as fluid 1, 2, to N to the different local use or wall mounted dispensers 416 as shown with greater detail at FIG. 4.

In one embodiment, a selector 406 can be either a three button AccuPro® from Hydro Systems® or an AccuDose® also from Hydro Systems®. These systems allow a proportional divider with selected dilution accuracy of the concentrated fluid 412, 413, 414 to which it is connected. A user sets dilution ratios for example 45 to 1 or even 250 to 1. In one embodiment, a three button solution is offered, the first for an "auto scrubber" dilution (30:1), the second for a "spray bottle" dilution (4:1), and the third for a "mop bucket" dilution (10:1). Also, the pneumatic pumping station with dilution used 403 can be for example of the type PECO Carwash Systems® model PE030 Low volume pneumatic pumping station. Finally, the buffer generator 410 as contemplated can be an HydroMinder® Model 515 from Hydro Systems®. The buffer generator 410 allows for the draw when required by a level detector in a dilution volume storage tank 411 from the reservoirs 412, 413, and 414 and generation of a volume of needed diluted product for use at the local level or at the wall mounted dispensers 416. Also as shown at FIG. 5 is the use of monitoring leveling tools 415 and different monitoring tools and level detectors of all of the different elements shown in the system 400. What is not shown as part of FIG. 5 is how electricity and power is drawn from networks to help power elements which require powering as known in the art.

One best mode currently sold is linked with the use of multiple fluid reservoirs 412, 413, and 414 with several concentrator dilution selectors 404. For example, a single setting dilutor can be mounted on reservoir 1 414, and a two setting dilutor can be mounted on reservoir 2 412. Some of the fluids include multi-purpose concentrated degreasers, and washer-fluids.

Hosting of the Control System

In today's world, physical structures left and installed at multiple different locations require maintenance, monitoring, and supervision/access often using a wireless interface remote from the physical structures. The use of the Internet (an HTML, based protocol) and of wireless portable devices using this HTML protocol or a different wireless protocol is used. This section along with FIGS. 6, and 7 describe one of the multiple different hosting systems which house software programmed to operate in this hardware layer.

Figure 6:
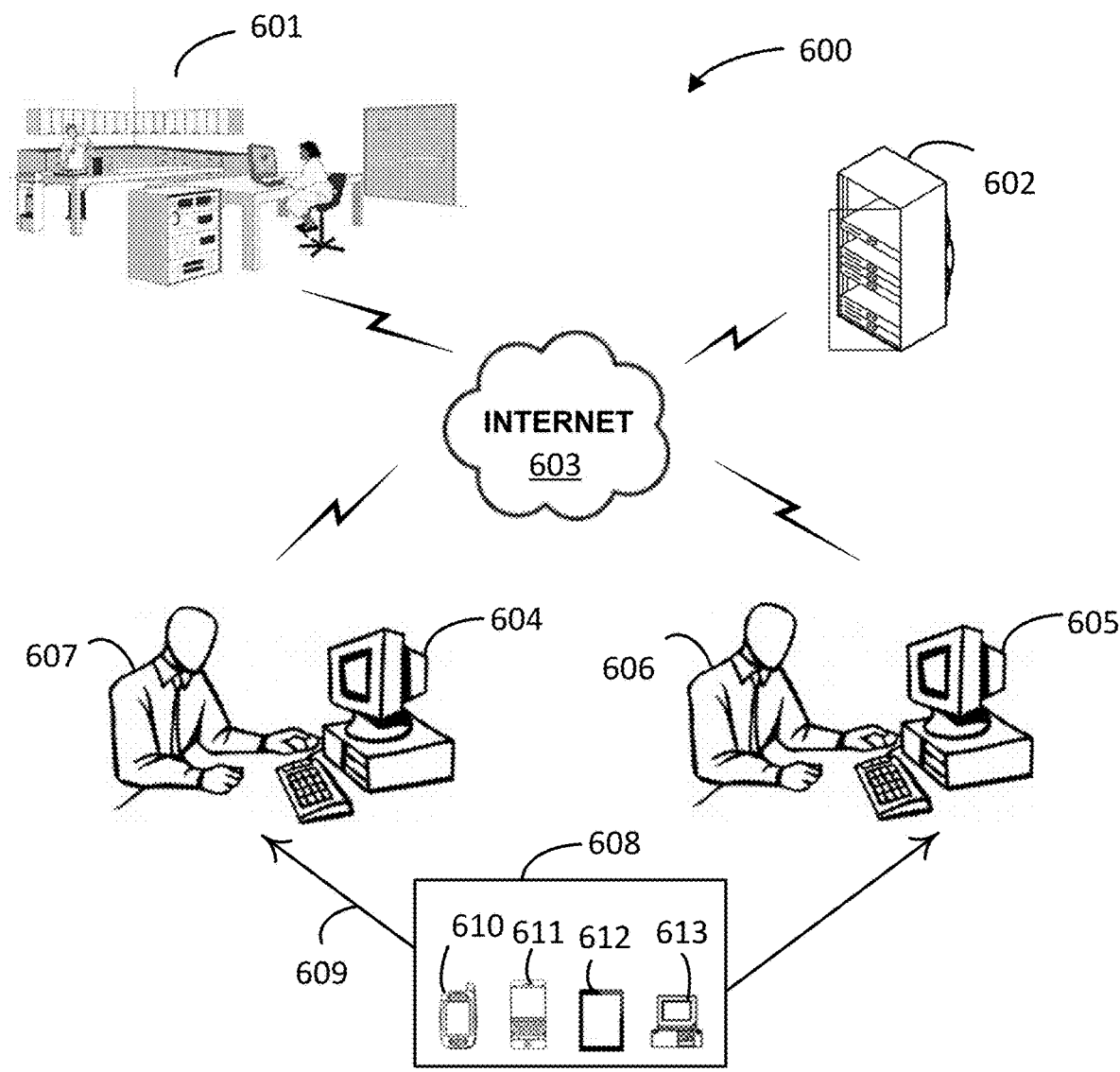
FIG. 6 is a function diagram of the hardware associated with the different elements of the system as shown at FIGS. 3-5.

To implement the transfer of services and associated transfer of resources, what is used in the current invention is a fully automated or partly automated system 600 as shown at FIG. 6. FIG. 6 shows generally how in today's environment multiple parties 606, 607 can use computer stations 604, 605 equipped with a display, a user interface and a processor unit connected to a memory to execute software for use by the parties. As shown, these parties 606, 607 are now capable of using 609 portable devices 608 instead of a computer station 604, 605, for example handheld devices 610, 611, 612, 613 having transceivers to connect to wireless networks, or transceivers to connect via web servers to the Internet 603 or any other network.

Generally, multiple different systems will be connected directly or indirectly to the parties' software, for example on a server 602. Different users 601 will then be able to connect remotely via the Internet 603 or other network communication systems to the different parties. The structure shown at FIG. 6 is illustrative only generally of the technology layer in the form of hardware used by the different parties, for example the users of the system, those who maintain the system shown at FIGS. 3-5. As shown in this figure, an app store at which, for example, software apps can be purchased or uploaded may be illustrated by the server 602.

Figure 7:
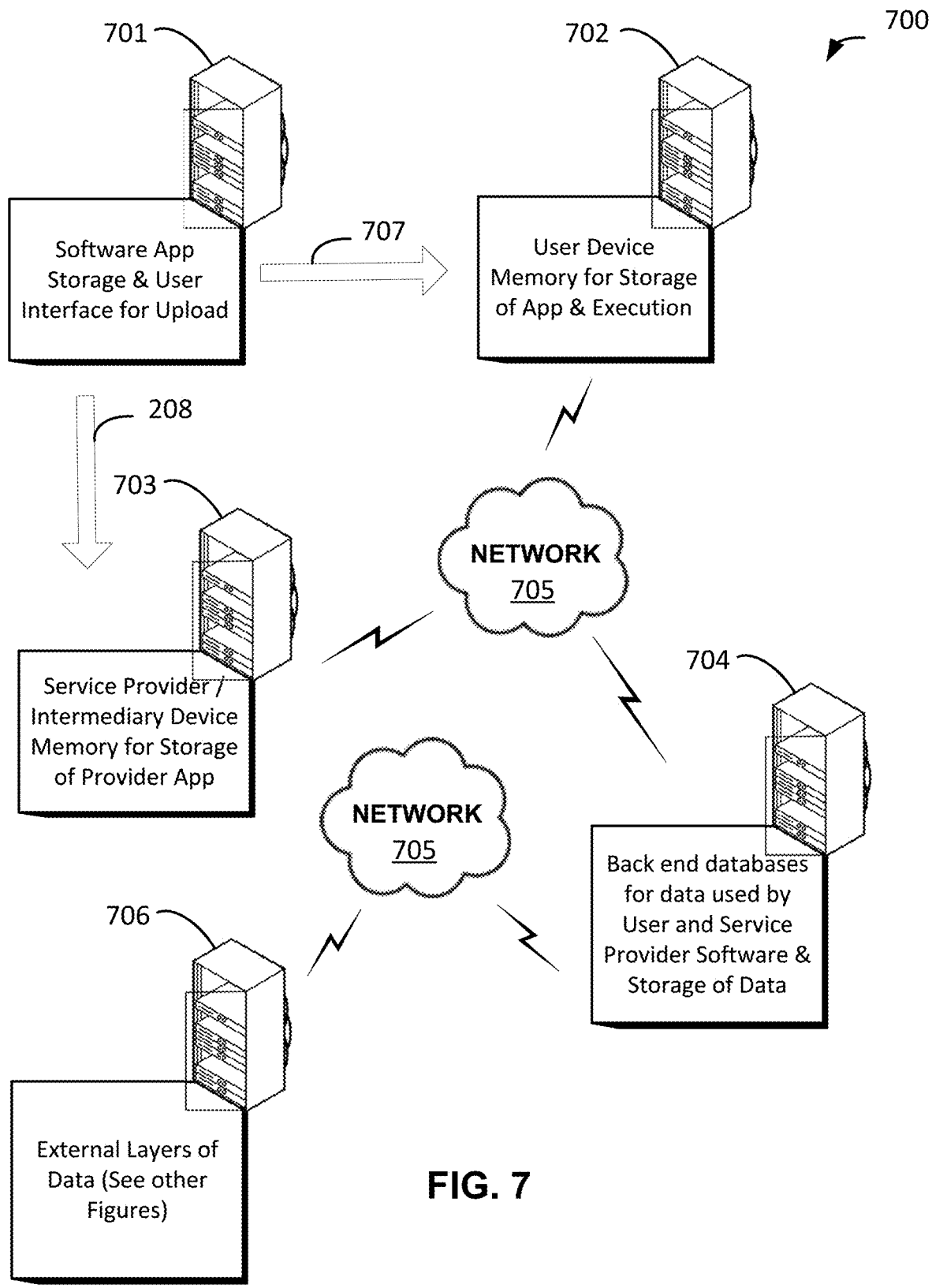
FIG. 7 is a diagram illustrating the global software/hardware layer hosting or managing Apps or HTML software over networks for download and execution over a portable device according to an embodiment of the present disclosure.

One of ordinary skill in the art will understand that each of the users may be equipped with some of the hardware illustrated at FIG. 6 as part of the process described above. FIG. 7 illustrates one possible software layer made of multiple interlaced applications and layers of software opening in hardware, for example the structure shown at FIG. 6 for services such as those described in tandem with the use of the system shown at FIGS. 3-5. In the overall software system 700, a stand-alone executable program, such as an program in app format (called an app) is uploaded into a storage server 701, for example an app store. Users will then access the store on the server using the network 705 and receive via the normal interface either a user device version 707 or a service provider version 708 based on the type of party uploading the app from the server 701. In one embodiment, a single version of the app can be produced for upload irrespective of the type of party (user or service provider). The app is then stored on the memory of the storage device used by the user 702 and the memory of the service provider device 703. For example, a doctor and a nurse can upload the app from the app store 701 onto their own handheld devices 703. A patient can also upload the app from the store 701 into a handheld device 702 for access. As shown by the arrows around the network 705, the users and the service providers can then be connected to each other via the network, using the app as executed in the software layer of each device. In addition to an App, what is also contemplated is the use of an HTML interface programmed specifically for wireless phones.

What is not shown is the computer software and hardware needed to create and upload the app to the app store 701. As with most Apps, once the software is made to execute, it can require either a regular data connection, regular updates or a live constant data connection with a back-end database that stores and makes the data available to the apps. The back-end server 704 can use any type of server and database commercially available on the market, for example an Oracle database. Data will then be exchanged between the different devices 701, 702, 703, and 704 using regular port technology, transceivers, wireless or non-wireless technology, and for example different HTML/API tools and layers to help with interface and communication of data. For example, the app of multiple users 702 may be programmed so at any moment at which a nurse or a doctor contact is initiated, the app will connect with the back-end database 704 and/or the status of the multiple service providers 703 to determine which link and connection should be immediately established or programmed for appointment. The data sent back to the doctor 703 may include client medical information and other relevant information. As the doctor and the patient use the network 705 to communicate, the doctor may use the software to help generate needed information from the database 704 or to get information about the user 702 from his/her device. While one structure of data communication is described, what is contemplated is the use of multiple devices, each with one or multiple versions of an app used and designed to exchange information together or with a back-end server.

Finally, FIG. 7 shows how other, generally remote external layers of data and information 706 can be connected to the system over the network 705. For example, in a case in which a user's software layer 703 is engaged in a one-to-one communication with a remote device software layer 702, the user may have a need to schedule an appointment to maintain or request maintenance.

The current disclosure relates to a system, software and hardware enabled in software that functions either in a new software layer or as pages of HTML format or other format in a browser of network information such as Internet information. This system is at the heart of a global, fully integrated platform in which clients can be connected directly with their service providers (users). The system 600 relies generally on the Internet 603, where several elements 601, 602, 604 and 605 are connected. For example, in one embodiment, a user 605 using a fixed terminal 613, a portable tablet 612, a web-enabled phone 611 or a WAP-enabled phone 610 or any other device 608 to communicate with a service provide 607 who is also using a device 604 such as a fixed terminal 613, a portable table 612, a web-enabled phone 611 or a WAP-enabled phone 610 or any other device 608.

Tank Monitoring Software Interface

An HTML indexed database is accessed via the internet through a normal web-portal with password and username or the same via a wireless interface. The owner of one or multiple systems in which multiple fluid reservoirs 1, 2, N as 412, 413, and 414 can log in to get critical information on each of the reservoir fluid levels. For each of the reservoirs 1, 2, to N, each will be given a different page. In one embodiment, once a person is logged in, he or she will be given general tank details, like (a) a tank name, (b) the name of the service provider, (c) the Cellular ID number, (d) a serial number, (e) the number of tanks placed, (f) the physical location & an associated map, and (g) the description of the product within the tank. While these parameters are listed, one ordinary skill in the art will recognize that any number of attributes can be listed.

Figure 8:
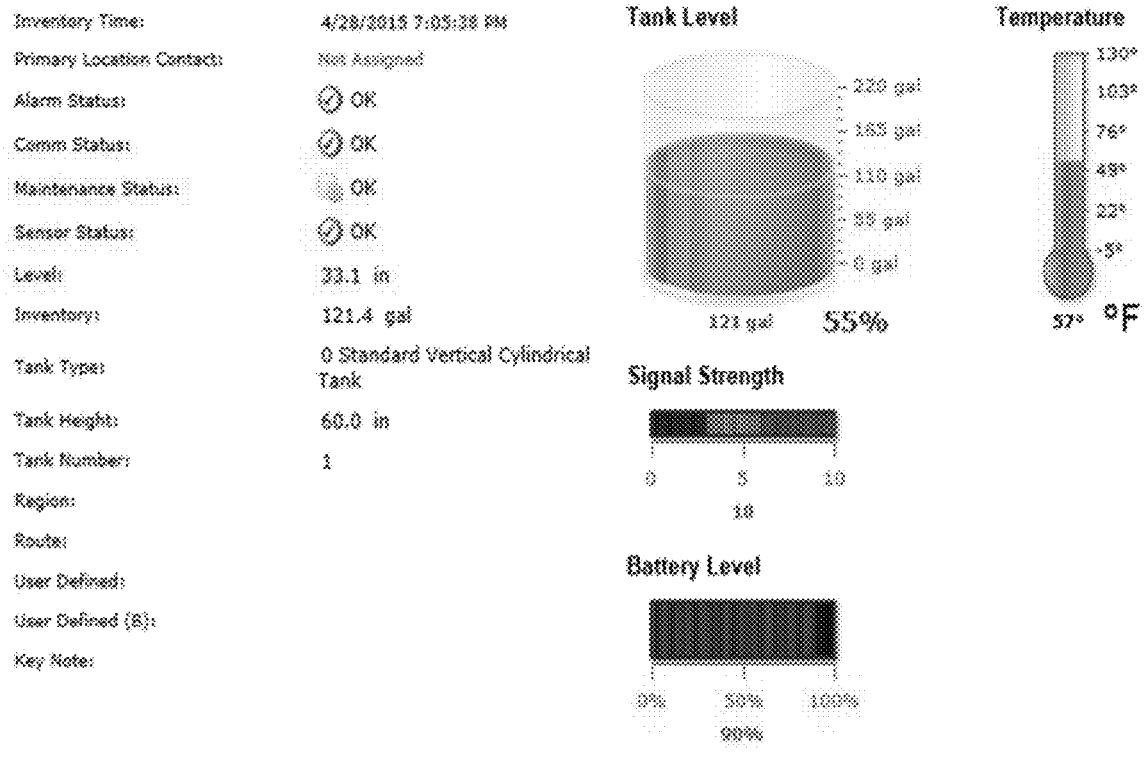
FIGS. 8-10 are screen illustrations of an online interface for the management and optimization of fluids and associated containers of fluids according to an embodiment of the present disclosure.

As shown in great detail at FIG. 8, multiple key metrics can be monitored permanently for each tank. For example, an alarm status, a communication status, a maintenance status, a sensor status, the level in inches in the tank, the inventory in gallons, the type of tank, the height of the tank, the temperature of the tank, the level in percentage, the signal strength of the sensor, and the battery level.

Figure 9:
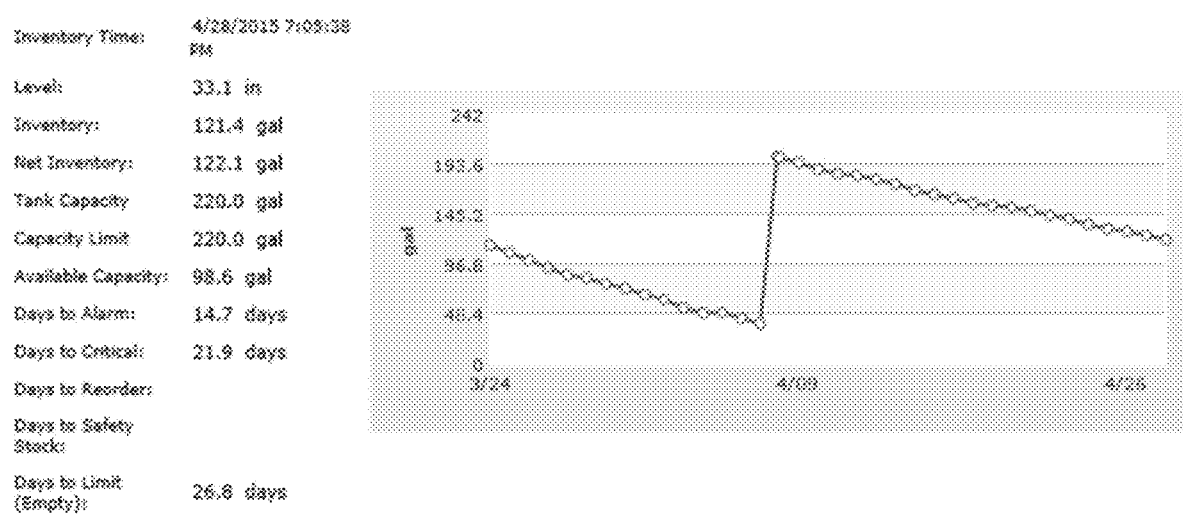
Figures 10, 11:
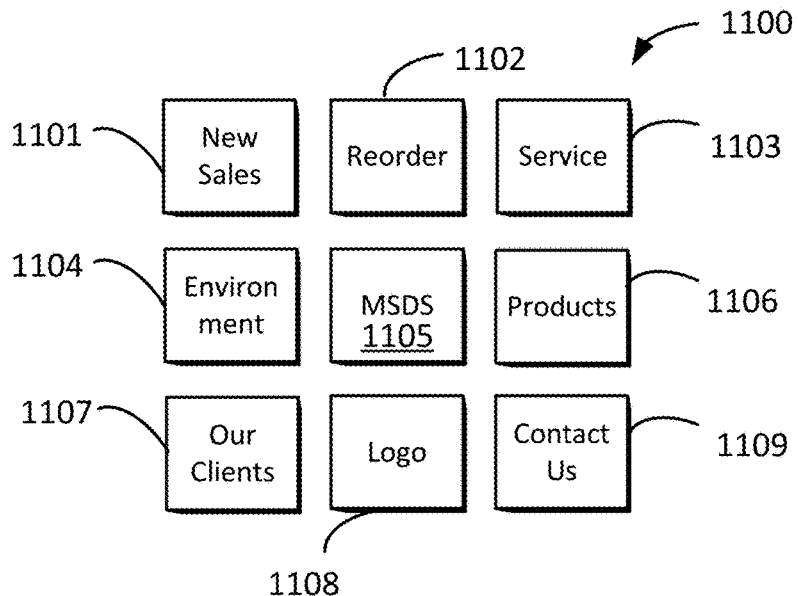
FIG. 11 is a diagram illustrating the different icons of an HTML or wireless phone based interface for coordinating service calls to clients.

The level of data available via this interface also offers inventory tracking, for example as shown at FIG. 9 a time sensitive graph which illustrates the available volume over time. At FIG. 10, more information can be given to a user, which includes a call schedule information to request calls and refills, an alarm setting section and basic device information which includes internal information of the device. In addition, inventory records are made available with a complete breakdown of each day with status, level in inches in a tank, levels in gallons, etc.

Client Software Interface

FIG. 9 shows the home interface of a HTML-based and portable wireless device general menu 1100. The first button 1101 relating to "new sales" directs to a contact with a local account manage who will immediately engage with the user. In some embodiments, a form must be filled and the account manager will contact the user directly. The use of the "reorder" button 1102 directs an existing user to a local service manager who will also in turn contact the user either after a form is filled with contact information or directly via phone or electronic contact. The next button named simply "service" 1103 does not related to reorder or resupply of quantity of product, instead a local service manager contacts the person directly. For example, if an existing client sees damage done to the system described above, the service 1103 button will be pressed. If the client desires to order more stock of the product, the button reorder 1102 will be pushed.

Button "environment" 1104 relates to all matters linked with the environment. In this field, many different issues can arise. For example, if a person discharges some or part of the products in a drain, the client may desire information. Other questions may also be raised. Finally, many products come with Material Safety Data Sheets (MSDSs). These documents contain information on the potential hazards (health, fire, reactivity and environmental) and how to work safely with the chemical product. By touching "MSDS" on the interface 1105, a list of these MSDS is given to the user. The button "products" 1106 as part of the menu 1100 at FIG. 11 offers services and programs packaged with information, for example a car and truck wash system, a facility maintenance, a specialty product, or a bulk windshield washer fluid. The last three buttons 1107, 1108, and 1109 offer content about a list of clients, the service provider, and contact information.

A system 200 as shown at FIG. 3 for optimizing the use of washing fluid at a service station, the service station having a retail vehicle service area 202, a retail vending area 206, and a vehicle repair area 210, the system 200 comprising at least a concentrated fluid reservoir 412, 413, and 414 at FIG. 4, at least one of either a pneumatic pumping station with dilution 403, a buffer generator 410 with dilution volume storage tank 411, or a multiple concentrator dilution selector 404, each connected to syphon a first concentrated fluid from the at least one concentrated fluid reservoir 412, 413, and 414, at least a dilutive water entry source 402 from a main from the vehicle repair area main water source in fluidic connection with each of the at least one of the group of elements comprising the pneumatic station with dilution 403, the buffer generator 410, and the multiple concentrator dilution selector 404, wherein each of the group of elements draw water from the dilutive water entry source and mix it with the first concentrated fluid from the concentrated fluid reservoir 412, 413, and/or 414 to generate a diluted fluid, and at least a wall mounted dispenser 416 and shown at FIG. 4 as 301, 302, 303, 304, 305, or 306 in fluidic contact with each of the group of elements with a hand delivery system, for example a hose and a sprout for providing to a user the diluted fluid such as diluted window washer fluid.

In one embodiment, the system 200 includes at least two wall mounted dispensers, the first located in the retail vehicle service area 305 or 306, and the second located in the vehicle service area 301, 302, or 303. In one embodiment, the wall mounted dispenser located in the retail vending service area 305, and 306 includes a customer payment system such as a credit card or a cash payment system. The system 200 can also include a level and monitoring sensor 415 connected to the at least one concentrated fluid reservoir 412, 413, or 414 with a remote wireless connectivity as shown generally at FIGS. 6-7, and an HTML interface for managing remotely the system as shown generally at FIGS. 8-10.

What is also contemplated is a system 200 for optimizing the income generation by the sale of washing fluids at a service station, the service station having a retail vehicle service area 202, a retail vending area 206, and a vehicle repair area 210, the system comprising a bulk volume of concentrated fluid sold at a bulk price, a system for use of the bulk volume of concentrated fluid 209 at the service station comprising at least a concentrated fluid reservoir 412, 413, or 414 for storage of the bulk volume of concentrated fluid, at least one of either a pneumatic pumping station with dilution 403, a buffer generator 410 with dilution volume storage tank 411, or a multiple concentrator dilution selector 404, each connected to syphon the bulk volume of concentrated fluid from the at least one concentrated fluid reservoir 412, 413, and 414, at least a dilutive water entry source 402 from a main from the vehicle repair area main water source in fluidic connection with each of the at least one of the group of elements comprising the pneumatic station with dilution 403, the buffer generator 410, and the multiple concentrator dilution selector 404, wherein each of the group of elements draw water from the dilutive water entry source and mix it with the first concentrated fluid from the concentrated fluid reservoir to generate a diluted fluid, and at least at least two wall mounted dispensers 416, the first located in the retail vehicle service area 202, and the second located in the vehicle service area 210, and wherein the wall mounted dispenser located in the retail vending service area 305 or 306 includes a customer payment system (not shown), and a purchase by a retail user of the diluted fluid at a retail price, and wherein the retail price is greater than the bulk price, and wherein the system generates additional income by selling bulk price products at retail price to the retail user.

Figure 12:
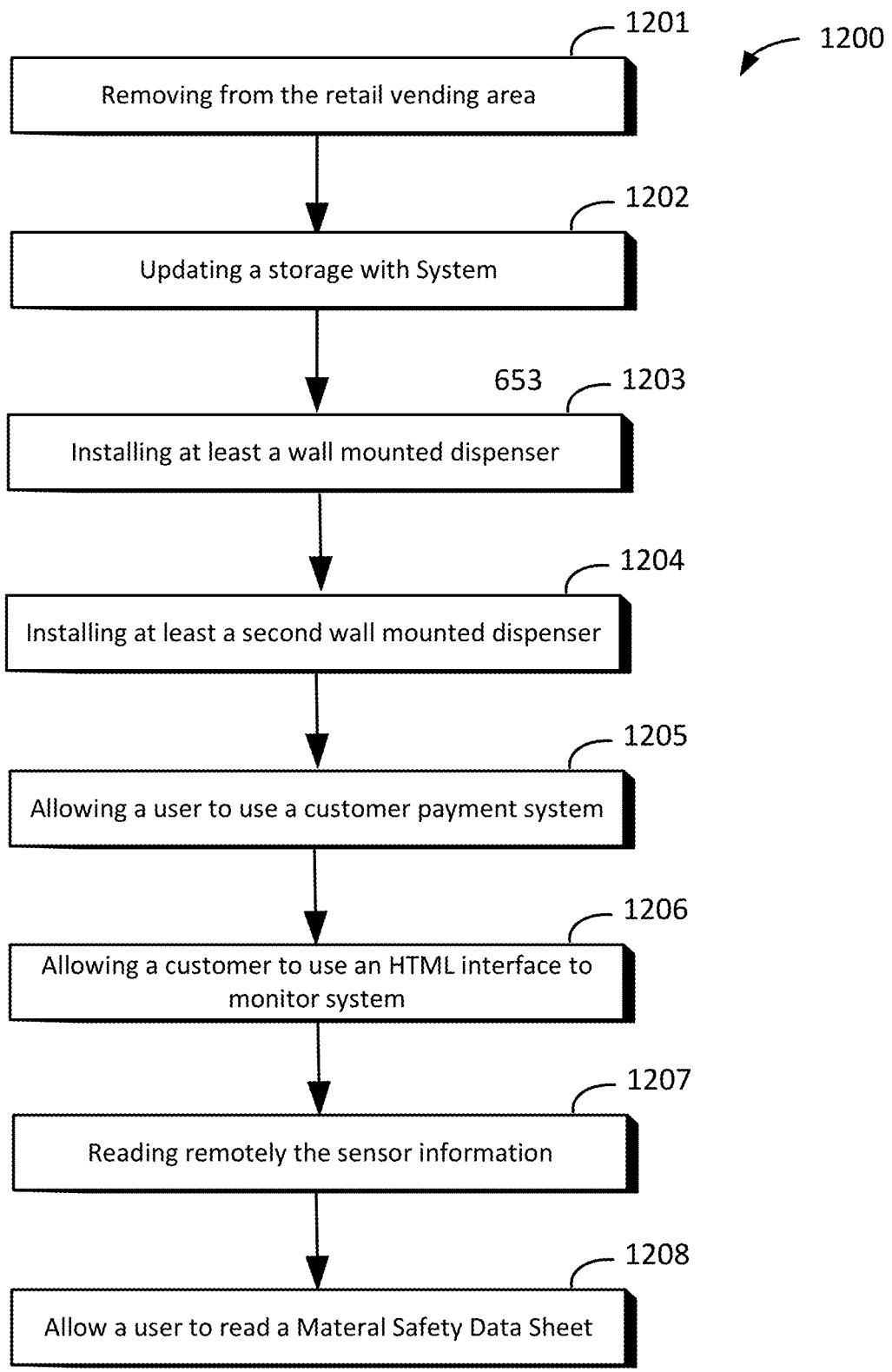
FIG. 12 is a diagram illustrating a method for use and optimizing the income of the system according to a first embodiment of the present disclosure.

As shown at FIG. 12, what is contemplated is a method 1200 of optimizing the use of washing fluid at a service station, the service station having a retail vehicle service area, a retail vending area, and a vehicle repair area, the method comprising the steps of removing 1201 from the retail vending area and or the retail vehicle area a volume of retail secondary fluid sold at a retail price and purchased for retail at a sale price, updating 1202 a storage of secondary fluid at a repair secondary fluid supply area purchased at a bulk price by including a system comprising at least a concentrated fluid reservoir, at least one of either a pneumatic pumping station with dilution, a buffer generator with dilution volume storage tank, or a multiple concentrator dilution selector, each connected to syphon a first concentrated fluid from the at least one concentrated fluid reservoir, at least a dilutive water entry source from a main from the vehicle repair area main water source in fluidic connection with each of the at least one of the group of elements comprising the pneumatic station with dilution, the buffer generator, and the multiple concentrator dilution selector, wherein each of the group of elements draw water from the dilutive water entry source and mix it with the first concentrated fluid from the concentrated fluid reservoir to generate a diluted fluid, and installing 1203 at least a wall mounted dispenser in fluidic contact with each of the group of elements with a hand delivery system for providing to a user the diluted fluid at a retail price.

In a related method, what is also contemplated is a further includes the step of installing 1204 at least two wall mounted dispensers, the first located in the retail vehicle service area, and the second located in the vehicle service area and also allowing 1205 a user use the wall mounted dispenser located in the retail vending service area of a customer payment system. Also the method may include a step allowing 1206 a customer to use the HTML interface to manage remotely the system and reading 1207 remotely the sensor information. Finally, the method includes the step of allowing 1208 a user to use a remote device to read at least Material Safety Data Sheet for the fluid sold.

Further shown and described is a system 1300 as shown at FIG. 13 for optimizing the use of washing fluid at a service station, the service station having a retail vehicle service 206 area and a vehicle repair area 210 which can be, when used for electric vehicle only standalone charging elements, the system 1200 comprising a portable device 360, at least a concentrated fluid reservoir 361 located on the portable device, a first dilution device on the portable device as described above with greater detail and shown functionally at FIG. 5 for example comprising either a pneumatic pumping station with dilution or a buffer generator with dilution volume storage tank, and a second dilution device comprising a multiple concentrator dilution selector, wherein the first and second dilution devices are connected to syphon a first concentrated fluid from the at least one concentrated fluid reservoir, at least a dilutive water entry source from a main from a vehicle repair area main water source or a water fluid reservoir 362 on the portable device 360 in fluidic connection with the first and second dilution devices, wherein the first and second dilution devices can draw water from the dilutive water entry source and mix it with the first concentrated fluid from the at least one concentrated fluid reservoir to generate a diluted fluid, at least a portable device-mounted dispenser 363 in fluidic contact with the first and second dilution devices with a hand delivery system 364 for providing to a local device 306 the diluted fluid, and wherein the local device comprises at least a user-vending mechanism 365 with at least a volumetric pump 366, a volume selector 367 connected to the volumetric pump for dispensing a volume selected by the user on a display 368, and a pouring nozzle 369.

The inventor also describes how the portable device as shown at FIG. 13 is located on a delivery vehicle 360, for example a small truck which is equipped with the equipment instead of having to leave the dilution heart locally at the station. In addition, the local device 306 for example can be a large vending machine known by most to purchase smaller items for car care. For example, such a vending machine has a section for air fresheners, power cables for car recharge of cell phones, and all other items for convenience to a car owner having to stop to recharge or refuel a vehicle. Also of interest is a vending machine where the open area next to the pouring nozzle offers multiple models of window blades for washing car windows.

In another embodiment, the location of the local device 306 may be as shown in the prior art (FIGS. 1-2) under lights but in an effort to avoid waste, instead of offering environmental lighting for a user, the inventor has included on the pouring nozzle a LED light (not shown) to provide local visibility to a user of the pouring nozzle 369 for easier dispensing of the volume selected.

The volume selector for example can be located on the display 368 and include a user payment system comprising one of, credit card payment, App-based payment, Touch-Payment or membership code entry payment. In some wireless payments, the display 368 can operate in tandem with an App software located on a portable phone connected to a wireless system. In some service stations, a full time attendant and cashier is present to help process payments but in others payment functions can be automated in one of multiple ways.

As explained, the first and second dilution devices that draw water from the dilutive water entry source and mix it with the first concentrated fluid from the at least one concentrated fluid reservoir to generate a diluted fluid are apportioned based on a volumetric ratio selector to fix a level of dilution by controlling the draw of water from the dilutive water entry source.

The inventor also has invented a system wherein the level of dilution fixed by the volumetric ratio selector is based on a geographic location. For example, in a warm southern State like Nevada, where windshields are often covered with dust and do not need a concentrated fluid and where the ambient temperature is always above freezing, the dilutive ratio could be set higher. In contrast, in places where snow is common like the state of Alaska where dilution must be lower for the washer fluid to retain fluidity at operating conditions. The inventor has also the selected geographic location also results in a price selection for user-vending mechanism. For example, fluid could be half the price in locations like Nevada over Alaska where more undiluted washer fluid. The display, also in a different embodiment gives the user an option based on the geographical location. Also, the need varies according to seasons and this results in price adaptation and different dilution levels.

The inventor also has described a system 1300 wherein the local device comprises at least a user-vending mechanism with at least a enclosed storage volume for a plurality of individual portions of the diluted fluid, a display and user interface for selecting and buying at least one of the plurality of individual portions, and a means for access to the storage volume once a payment is completed at the user interface. The means, for example is a trap door or a revolving door.

Figure 14:
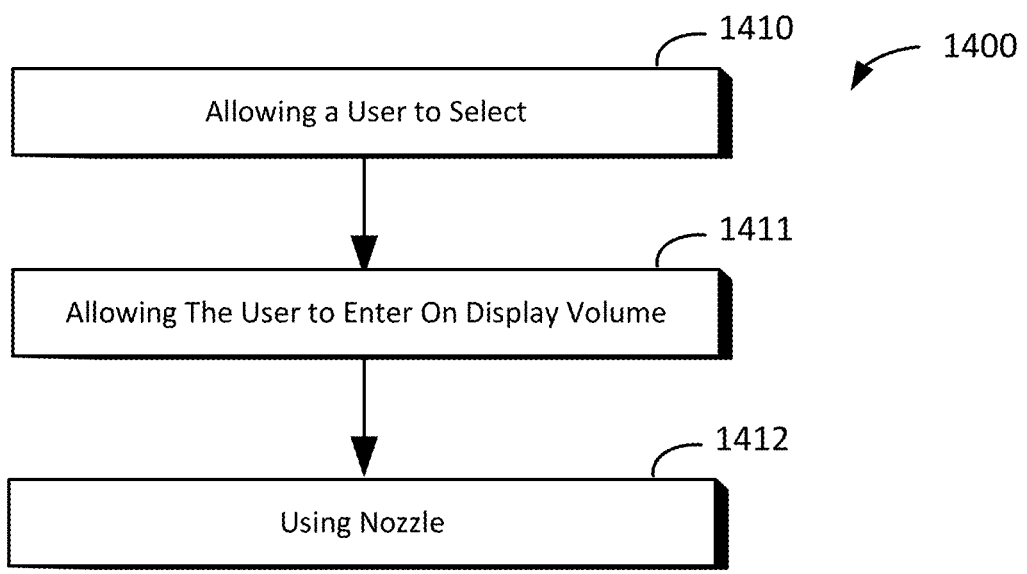
FIG. 14 is a illustration of a method of use of the system shown at FIG. 13 according to an embodiment of the present disclosure.

FIG. 14 shows a method of generating revenue 1400 from a system as described above, the method including the steps of allowing 1410 a user to select either an electrical charge of a vehicle or the dispensing of a diluted and cost-effective washing fluid, allowing 1411 the user to enter on the display the volume selected for dispensing of the diluted washing fluid, and using 1412 the pouring nozzle to fill in a vehicle-boarded volume for holding window washing fluid.

It is understood that the preceding is merely a detailed description of some examples and embodiments of the present invention and that numerous changes to the disclosed embodiments may be made in accordance with the disclosure made herein without departing from the spirit or scope of the invention. The preceding description, therefore, is not meant to limit the scope of the invention but to provide sufficient disclosure to one of ordinary skill in the art to practice the invention without undue burden.

What is claimed is:

1. A system for optimizing the use of washing fluid at a service station, the service station having a retail vehicle service area and a vehicle repair area, the system comprising:
   a portable device;
   at least a concentrated fluid reservoir located on the portable device,
   a first dilution device on the portable device comprising either a pneumatic pumping station with dilution or a buffer generator with dilution volume storage tank, and a second dilution device comprising a multiple concentrator dilution selector, wherein the first and second dilution devices are connected to syphon a first concentrated fluid from the at least one concentrated fluid reservoir,
   at least a dilutive water entry source from a main from a vehicle repair area main water source or a water fluid reservoir on the portable device in fluidic connection with the first and second dilution devices, wherein the first and second dilution devices can draw water from the dilutive water entry source and mix it with the first concentrated fluid from the at least one concentrated fluid reservoir to generate a diluted fluid,
   at least a portable device-mounted dispenser in fluidic contact with the first and second dilution devices with a hand delivery system for providing to a local device the diluted fluid; and
   wherein the local device comprises at least a user-vending mechanism with at least a volumetric pump, a volume selector connected to the volumetric pump for dispensing a volume selected by the user on a display, and a pouring nozzle.

2. The system of claim 1, wherein the portable device is located on a delivery vehicle and the local device is a vending machine.

3. The system of claim 1, wherein the pouring nozzle also includes a LED light to provide local visibility to a user of the pouring nozzle for easier dispensing of the volume selected.

4. The system of claim 1, wherein the volume selector is located on the display and includes a user payment system comprising one of, credit card payment, App-based payment, Touch-Payment or membership code entry payment.

5. The system of claim 1, wherein the first and second dilution devices that draw water from the dilutive water entry source and mix it with the first concentrated fluid from the at least one concentrated fluid reservoir to generate a diluted fluid are apportioned based on a volumetric ratio selector to fix a level of dilution by controlling the draw of water from the dilutive water entry source.

6. The system of claim 5, wherein the level of dilution fixed by the volumetric ratio selector is based on a geographic location.

7. The system of claim 6, wherein the selected geographic location also results in a price selection for user-vending mechanism.

8. A system for optimizing the use of washing fluid at a service station, the service station having a retail vehicle service area and a vehicle repair area, the system comprising:
   a portable device;
   at least a concentrated fluid reservoir located on the portable device,
   a first dilution device on the portable device comprising either a pneumatic pumping station with dilution or a buffer generator with dilution volume storage tank, and a second dilution device comprising a multiple concentrator dilution selector, wherein the first and second dilution devices are connected to syphon a first concentrated fluid from the at least one concentrated fluid reservoir,
   at least a dilutive water entry source from a main from a vehicle repair area main water source or a water fluid reservoir on the portable device in fluidic connection with the first and second dilution devices, wherein the first and second dilution devices can draw water from the dilutive water entry source and mix it with the first concentrated fluid from the at least one concentrated fluid reservoir to generate a diluted fluid,
   at least a portable device-mounted dispenser in fluidic contact with the first and second dilution devices with a hand delivery system for providing to a local device the diluted fluid; and
   wherein the local device comprises at least a user-vending mechanism with at least a enclosed storage volume for a plurality of individual portions of the diluted fluid, a display and user interface for selecting and buying at least one of the plurality of individual portions, and a means for access to the storage volume once a payment is completed at the user interface.

9. The system of claim 8, wherein the portable device is located on a delivery vehicle and the local device is a vending machine.

10. The system of claim 8, wherein the enclosed storage volume includes a display window for allowing a user to see at least one of the plurality of individual portions of the diluted fluid.

11. The system of claim 9, wherein display includes a user payment system comprising one of, credit card payment, App-based payment, Touch-Payment or membership code entry payment.

12. The system of claim 8, wherein the first and second dilution devices that draw water from the dilutive water entry source and mix it with the first concentrated fluid from the at least one concentrated fluid reservoir to generate a diluted fluid are apportioned based on a volumetric ratio selector to fix a level of dilution by controlling the draw of water from the dilutive water entry source.

13. The system of claim 12, wherein the level of dilution fixed by the volumetric ratio selector is based on a geographic location.

14. The system of claim 13, wherein the selected geographic location also results in a price selection for user-vending mechanism.

15. A method of generating revenue from a system for optimizing the use of washing fluid at a charging station, the charging station having a source for electricity for charging an electric vehicle and a source of diluted washing fluid, the system comprising:

a bulk volume of concentrated fluid sold at a first price, and a sub-system for dilution of the bulk volume of concentrated fluid at a charging station, the sub-system comprising:

a portable device;

at least a concentrated fluid reservoir located on the portable device, a first dilution device on the portable device comprising either a pneumatic pumping station with dilution or a buffer generator with dilution volume storage tank, and a second dilution device comprising a multiple concentrator dilution selector, wherein the first and second dilution devices are connected to syphon a first concentrated fluid from the at least one concentrated fluid reservoir, at least a dilutive water entry source from a main from a vehicle repair area main water source or a water fluid reservoir on the portable device in fluidic connection with the first and second dilution devices, wherein the first and second dilution devices can draw water from the dilutive water entry source and mix it with the first concentrated fluid from the at least one concentrated fluid reservoir to generate a diluted fluid, at least a portable device-mounted dispenser in fluidic contact with the first and second dilution devices with a hand delivery system for providing to a local device the diluted fluid; and wherein the local device comprises at least a user-vending mechanism with at least a volumetric pump, a volume selector connected to the volumetric pump for dispensing a volume selected by the user on a display, and a pouring nozzle;

the method including the steps of:

allowing a user to select either an electrical charge of a vehicle or the dispensing of a diluted and cost-effective washing fluid;

allowing the user to enter on the display the volume selected for dispensing of the diluted washing fluid;

using the pouring nozzle to fill in a vehicle-boarded volume for holding window washing fluid.

16. The method of claim 15, wherein the sub-system further includes a level and monitoring sensor connected to the at least one concentrated fluid reservoir with a remote wireless connectivity, and an HTML interface for managing remotely the system.

17. The system of claim 16, wherein the HTML interface for managing remotely the system includes a first internet-based database with user password, and at least a label for the at least one concentrated fluid reservoir, and a display of the level and monitoring sensor.

18. The system of claim 17, wherein the HTML interface further includes a second tool to provide Material Safety Data Sheets.

* * * * *